United States Patent [19]

Inaba et al.

[11] Patent Number: 5,069,613
[45] Date of Patent: Dec. 3, 1991

[54] CRANK TYPE MOLD CLAMPING APPARATUS WITH VARIABLE STROKE

[75] Inventors: Yoshiharu Inaba, Kawasaki; Masao Kamiguchi, Oshino, both of Japan

[73] Assignee: Fanuc Ltd, Minamitsuru, Japan

[21] Appl. No.: 343,146

[22] PCT Filed: Jun. 25, 1988

[86] PCT No.: PCT/JP88/00635
§ 371 Date: Apr. 13, 1989
§ 102(e) Date: Apr. 13, 1989

[87] PCT Pub. No.: WO89/12541
PCT Pub. Date: Dec. 28, 1989

[51] Int. Cl.⁵ .............................................. B29C 45/80
[52] U.S. Cl. ................................. 425/150; 264/40.5; 425/451.4; 425/451.5; 425/589; 425/592
[58] Field of Search ................. 425/150, 451.4, 451.5, 425/451.6, 589, 592, 593; 264/40.5, 328.11

[56] References Cited

U.S. PATENT DOCUMENTS

| 3,830,614 | 8/1974 | Kurtz | 425/451.6 |
| 4,158,539 | 6/1197 | Arends et al. | 425/451.4 |
| 4,588,364 | 5/1986 | Schad | 425/451.4 |
| 4,710,119 | 12/1987 | Otake | 425/150 |

FOREIGN PATENT DOCUMENTS 60-115419 6/1985 Japan.
62-156919 7/1987 Japan.

*Primary Examiner*—Timothy Heitbrink
*Attorney, Agent, or Firm*—Staas & Halsey

[57] ABSTRACT

A crank mold clamping apparatus capable of variably adjusting a mold-opening stroke for permitting usage of various types of molds which includes a numerical control apparatus for controlling a servomotor for driving a crank plate connected to a movable platen in forward and reverse rotation within a limited rotation region. The numerical control apparatus calculates a rotation angle between rotational positions of the crank plate corresponding to mold clamping and mold-opening end positions of the movable plate, respectively, so that the crank plate is rotated for the calculated rotation angle in the direction of mold-opening or mold-closing to perform mold-opening or mold-closing when a mold-opening stroke, determined in accordance with the size of a mold to be used, is supplied.

6 Claims, 4 Drawing Sheets

# CRANK TYPE MOLD CLAMPING APPARATUS WITH VARIABLE STROKE

TECHNICAL FIELD

The present invention relates to a mold clamping apparatus for use in an injection molding machine, and more particularly, to an electrically-operated crank type mold clamping apparatus with a variable stroke, which is provided with a movable platen adjustable in length stroke between a mold-clamping position and a mold-opening position.

BACKGROUND ART

Mold clamping apparatuses of an injection molding machine are classified into toggle, direct, and crank types in relation to a drive force transmission mechanism, and are classified into hydraulic and servomotor-operated types in relation to a drive force generating source.

In general, a hydraulic injection molding machine uses an operating fluid which is liable to be affected by the atmospheric temperature so as to expand and contract in volume. For this reason, a stable clamping force and repeatability are difficult to obtain. Moreover, complicated maintenance is required, and it is difficult to obtain clean molding products. In this respect, an advantage of a servomotor-operated mold clamping apparatus, without the need of using pressurized fluid, has been recognized.

In a servomotor-operated direct mold clamping apparatus, a complicated control is required for adjustment of the mold-opening stroke. It is difficult to produce a large mold clamping force because of the difficulty in changing to any significant degree magnitude of the drive force during the time between when mold-opening or mold-closing is effected and when mold clamping is effected.

A servomotor-operated toggle mold clamping apparatus is capable of producing a large mold clamping force by increasing the motor output by means of a toggle mechanism. Significant labor is required, however, for a lockup operation, and hence a high-speed injection molding cycle cannot be achieved.

On the other hand, a crank mold clamping apparatus is advantageous in that it has a simplified structure and is capable of carrying out the injection molding cycle at a high speed. However, this type of apparatus is arranged so that a moving platen assumes the mold-closing position and the mold-opening position when a crank reaches its top dead center and bottom dead center, respectively, during one revolution of the crank, and hence the mold-opening stroke of the apparatus is fixedly determined in dependence on the crank length. Thus, it is poor in versatility. For instance, when a three plate type of mold, having a stripper plate for ejecting a mold product, disposed for movement between mold halves which are attached to the front and movable platens, respectively, is employed in an injection molding machine having a fixed mold-opening stroke, only a particular mold is usable for a particular injection molding machine because an individual mold has its proper mold-opening distance. Therefore, this type of mold lacks usefulness in practical use unless it is employed in a mold clamping apparatus which is variable in its mold-opening stroke. In this respect, conventionally, the crank mold clamping apparatus having the above-mentioned advantages has been hardly utilized.

DISCLOSURE OF THE INVENTION

The object of the present invention is to provide a crank mold clamping apparatus with variable stroke, which has an arbitrarily adjustable mold-opening stroke, and hence makes it possible to employ various types of molds.

In order to achieve the above-mentioned object, according to the present invention, a crank mold clamping apparatus for use in an injection molding machine having a movable platen, comprises a crank disposed for rotation, a coupling member coupling the crank and the movable platen, means coupled to the crank for driving the crank in forward and reverse rotation, means for variably setting a mold-opening stroke, and means for controlling the driving means so that the crank is rotated forwardly and reversely within a limited rotational angular region corresponding to the thus set mold-opening stroke.

According to the present invention, since the crank is rotated forwardly and reversely within a limited rotational angular region, an arbitrary adjustment of the mold-opening stroke, which has been difficult to achieve heretofore, can be achieved. Hence, various types of molds, including a three plate type of mold, can be used for production of desired mold products, while still enjoying the advantages of a crank mold clamping apparatus such as a simplified structure and the ability to achieve a high-speed injection molding cycle.

BEST MODE OF CARRYING OUT THE INVENTION

Figure 2:
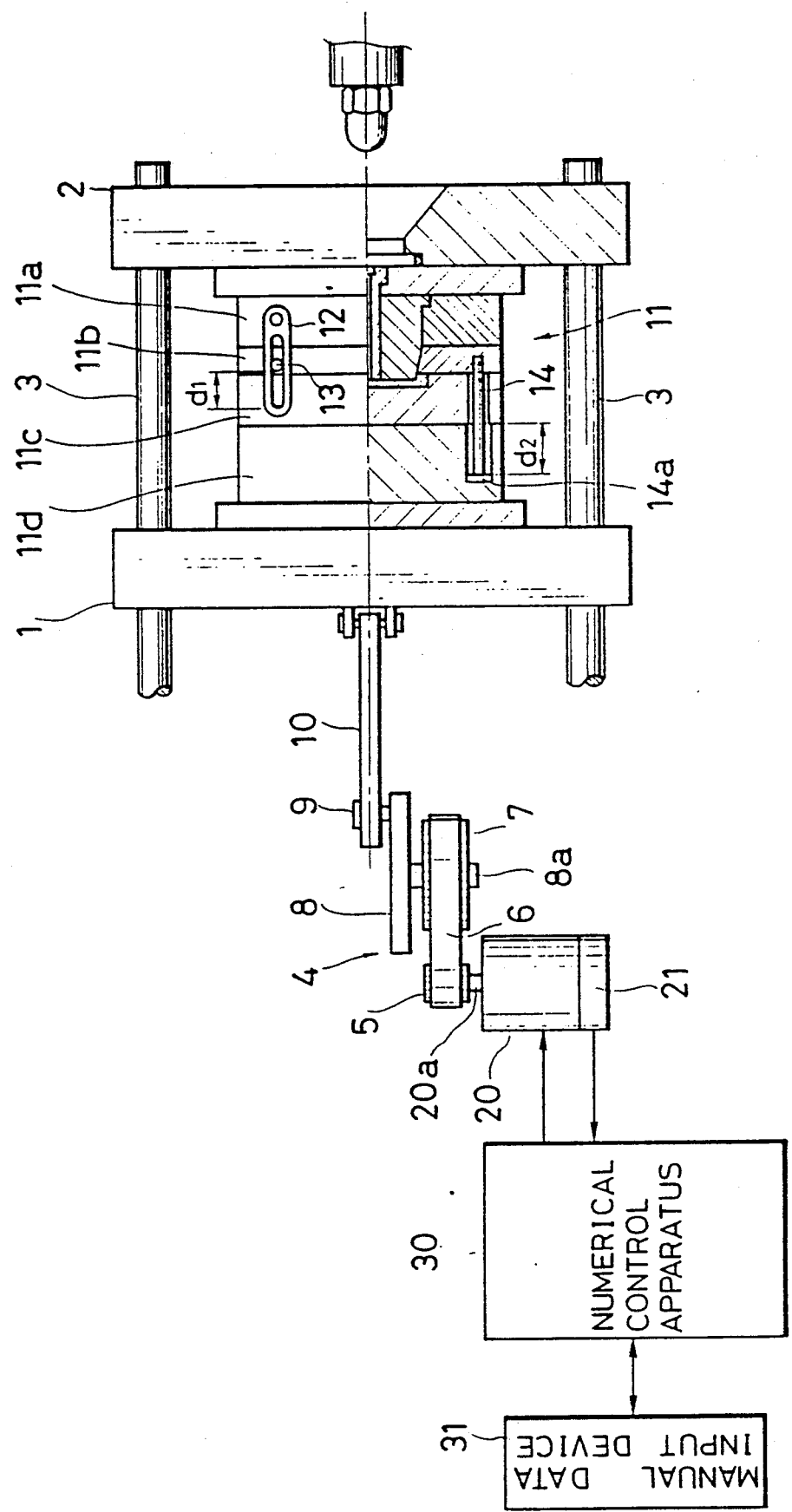
FIG. 2 is a fragmentary plane view, partly in cross section, showing the mold clamping apparatus together with relevant parts of an injection molding machine.

In FIG. 2, a movable platen 1 is mounted on tie bars for slidable movement therealong extending between a front platen 2 and a rear platen (not shown). A crank mechanism 4 for causing a reciprocal movement of the movable platen 1 comprises a circular crank plate 8 which has a crank shaft 8a rotatably supported by an appropriate means (not shown). A pin 9 is mounted on the crank plate 8 at a location, closest to the movable platen 1, on the peripheral edge portion thereof. Pivotally coupled to the pin 9 is one end of a connecting rod 10 which connects the platen 1 to the plate 8 and has another end rotatably supported by a shaft provided at a central portion of a rear face of the movable platen 1. Toothed gears 5 and 7 are fixed on an output shaft 20a of a servomotor 20 and the crank shaft 8a of the crank plate 8, respectively, and a timing belt 6 extends between these gears.

Reference numeral 11 denotes a three plate type of mold, mounted between the movable platen 1 and the front platen 2 the mold 11, comprises a core plate 11a, a stripper plate 11b, a cavity plate 11c, and a back plate 11d which is integral with the plate 11c. The stripper plate 11b is disposed for movement along a guide (not shown) provided within the core plate 11a, and has a pin 13, for restricting the movement of this plate, mounted on an outer face thereof which is slidably engaged with an elongated hole formed in a stopper arm 12 which is fixed at one end to an outer face of the core plate 11a. Thus, the stripper plate 11b is movable toward and away from the core plate 11a within an allowable relative moving range d1. Further, the stripper plate 11b is formed with a screw hole with which a threaded portion of a stripper pin 14, extending through holes formed in the cavity plate 11c and the back plate 11d, is engaged so that the pin 14 is fixed to the plate 11b. The pin 14 has a stopper 14a which is disposed for abutment with the end of the blind hole of the back plate 11d and an end face of the plate 11c at a location at which the back plate 11d and the cavity plate 11c are joined, so that a relative movement of the pin between the cavity plate 11c and the stripper plate 11b is limited to a value of d2. Thus, the mold-opening stroke S as shown in FIGS. 1A and 1B is represented by the sum of both of the allowable relative moving amounts d1 and d2.

Figure 1A:
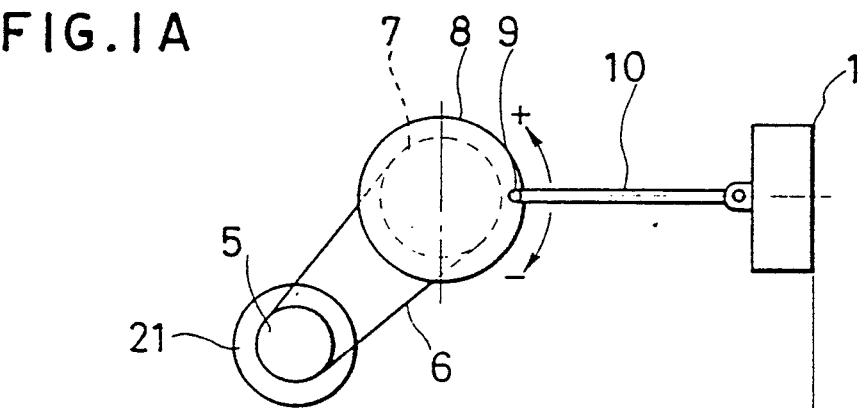
FIGS. 1A through FIG. 1C are diagrammatic side views illustrating the operation of a crank mold clamping apparatus with variable stroke according to an embodiment of the present invention.
Figure 1B:
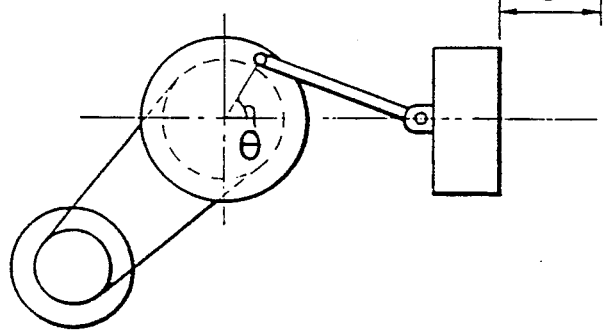
Figure 1C:
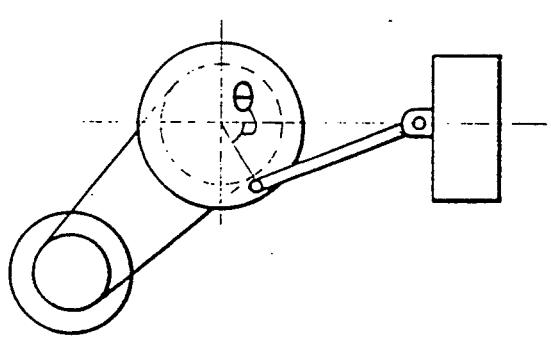

In this embodiment, the movable platen 1 is arranged to be reciprocated, by the crank mechanism 4, between a mold clamping position shown in FIG. 1A and a mold-opening end position shown in FIGS. 1B and 1C, both the positions being determined in dependence on the mold-opening stroke S which is proper to the mold 11. Here, it is assumed that the angular position of the crank plate 8 at the mold clamping is represented by 0, a required rotation angle $\theta$ of the crank plate 8 for the above-mentioned reciprocal movement is given by equation (1) because the angular position of the crank plate 8 at the completion of mold-opening is given by $\theta$ or $-\theta$.

$$\theta = \arccos[\{S^2 - 2(l_1 + l_2)S = 2l_1(l_1 = l_2)\} \div \{-2l_1 \cdot S + 2l_1(-l_1 + l_2)\}] \quad (1)$$

wherein $l_1$ represents the distance between the crank shaft 8a and the pin 9, and $l_2$ represents the effective length of the connecting rod 10.

To effect rotation angle control of the crank plate and hence for control of the stroke of the movable platen, a numerical control apparatus 30 for executing a stroke control program mentioned later is provided, and is connected in control relation with the servomotor 20. A pulse encoder 21 is attached to the servomotor 20 for detecting the rotational position of the servomotor. Reference numeral 31 denotes a manual data input device (hereinafter referred to as MDI) with a CRT display unit for inputting various data relating to the mold-opening stroke of the mold 11, which includes data indicative of a type of mold.

Figure 4:
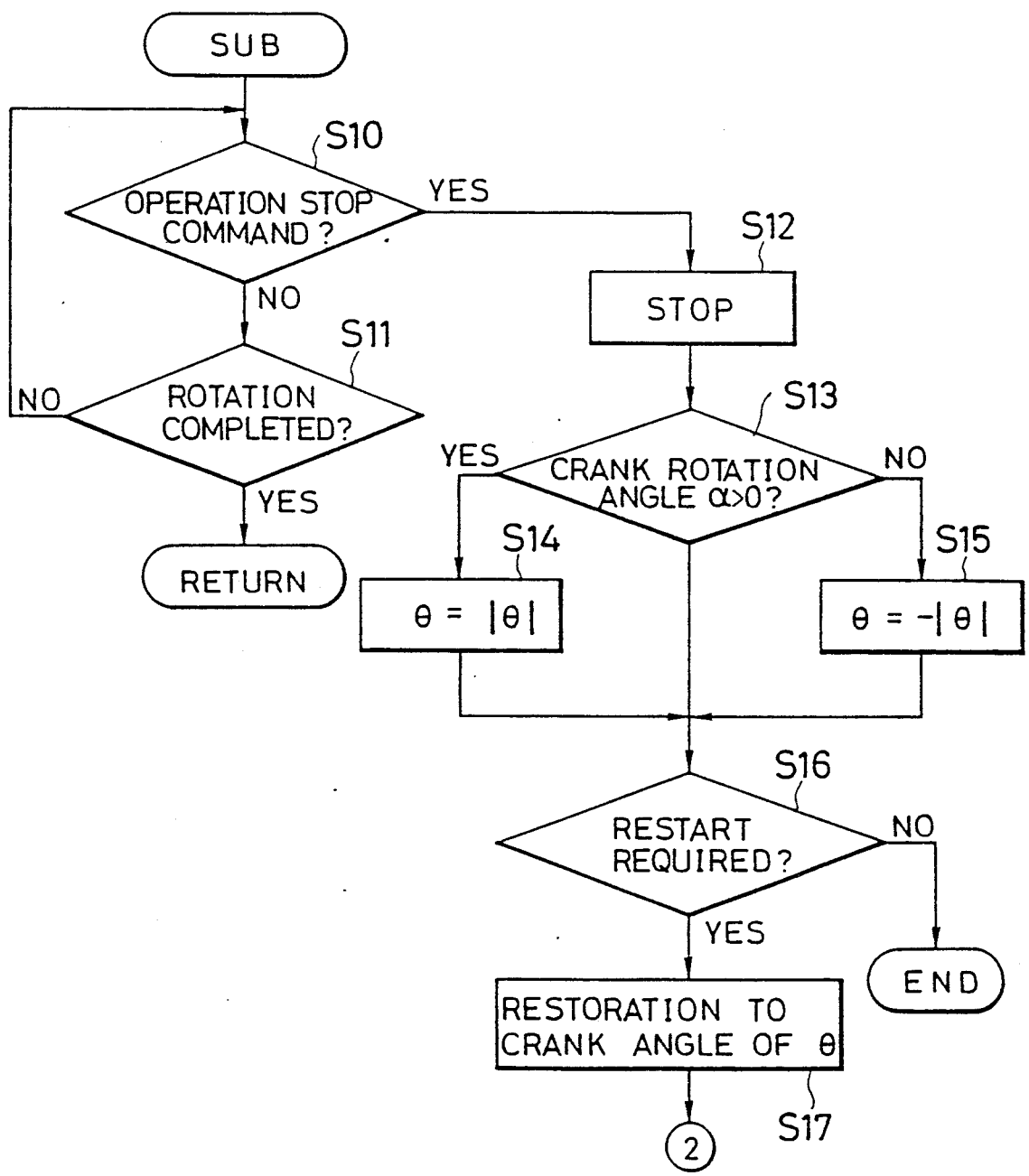
FIG. 4 is a flowchart of a control program for stopping/restarting the operation of the mold clamping apparatus.

In the following, the operation of the mold clamping apparatus will be explained with reference to FIGS. 2 and 4.

Initially, the numerical control apparatus 30 stores various data, inputted by an operator through the MDI 31 which includes a mold-opening stroke S and molding conditions such as a cooling time period T determined in accordance with a kind of the mold to be employed, into a memory (not shown) accommodated in the apparatus 30 at step S01. Then, the apparatus 30 calculates a required rotation angle $\theta$ associated with the thus input-ted stroke S on the basis of equation (1) at the step S02, and awaits for supply of a mold setting completion signal inputted through the MDI 31 (the step S03).

The operator meanwhile mounts the mold 11 in the manner shown in FIG. 2 where the mold halves are joined to each other, while the program is in its standby mode of the step S03, and inputs the mold setting completion signal to the numerical control apparatus 30 through the MDI 31 upon completion of the mold mounting operation.

Upon supply of the mold setting completion signal, the numerical control apparatus 30 delivers, to the servomotor 20, a command for causing the crank plate 8 to rotate forwardly over the desired rotation angle $\theta$ from the rotational position 0 to the target rotational position $\theta$ (the step S05) so that the movable platen 1 is moved over the stroke S from the mold clamping position of FIG. 1A to the mold-opening end position of FIG. 1B, to thereby complete the preparation for start of the injection molding cycle, and then awaits for supply of a cycle start signal (the step S06).

When the cycle start signal is inputted by the operator through the MDI 31, the numerical control apparatus 30 inverts the sign of the desired rotation angle $\theta$, indicative of the direction in which the crank plate is to be rotated, for movement of the crank plate 8 to the mold clamping position ($\theta = 0$) of FIG. 1A (the step S07), and then supplies the servomotor 20 with a command for causing the crank plate 8 to rotate by rotation angle of $\theta$ (the step S08). Thereafter, a subroutine shown in FIG. 4 for operation stopping/restarting control is entered (the step S09).

In this subroutine, the numerical control apparatus 30 determines whether or not an operation stop command for emergency stoppage, for instance, is supplied while the movable platen 1 is driven for the mold-opening or mold-closing operation (the step S10). If no operation stop command is supplied, whether or not the servomotor 20 is rotated up to the commanded position, i.e., whether or not the mold-opening or mold-closing operation of the movable platen 1 is completed, is determined on the basis of a value of a current position register (not shown) which receives an output signal from the pulse encoder 21 (the step S11). If the mold-closing or mold-opening operation is not completed, the program returns to the step S10.

In this manner, a loop consisting of the step S10, S11, and S10 is repetitively executed until the operation stop command is detected at the step S10, or when the completion of rotation of the servomotor 20, i.e., the completion of the mold-opening or mold-closing operation for the present control cycle is detected at the step S11.

Figure 3:
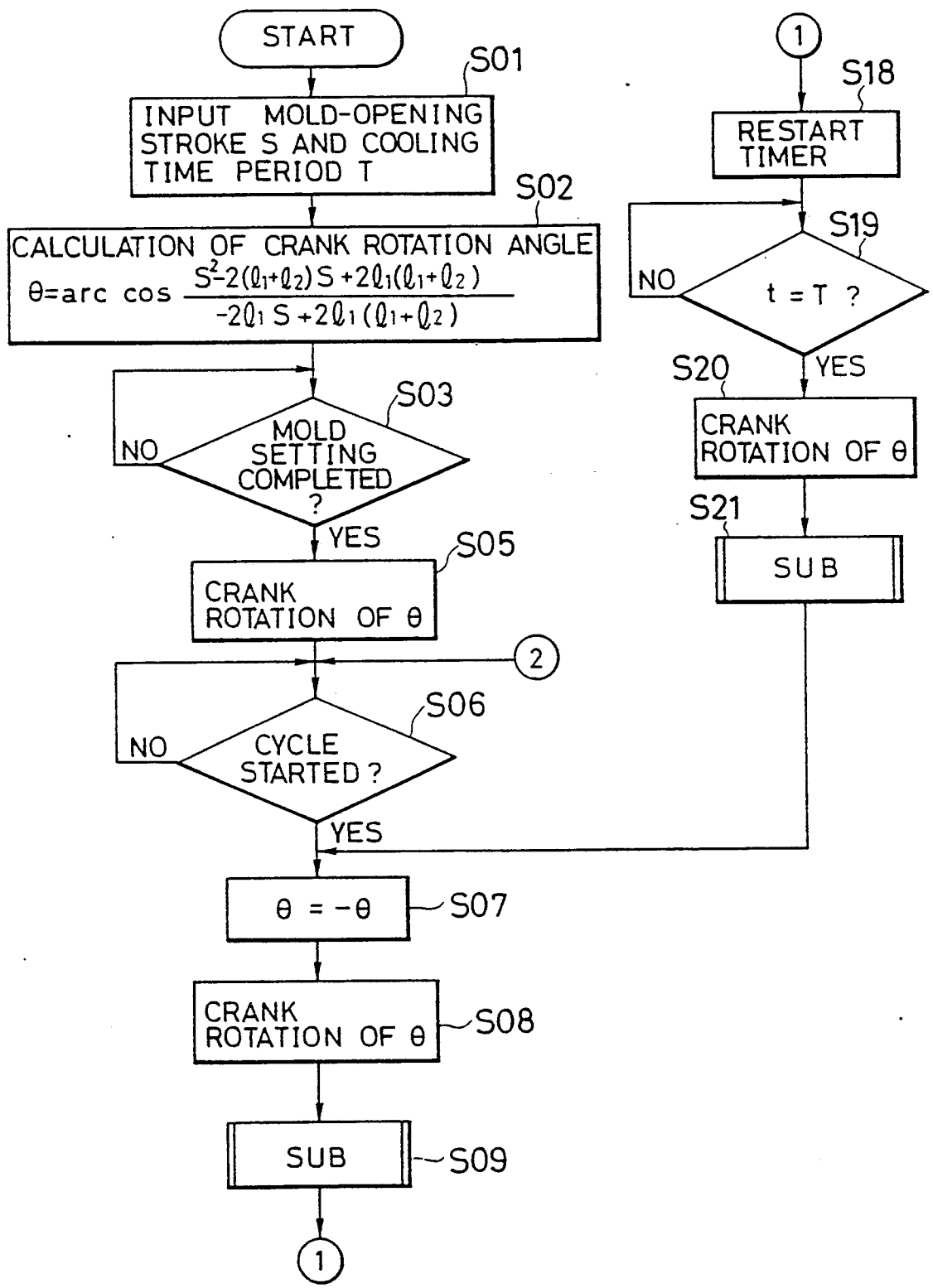
FIG. 3 is a flowchart of a stroke control program for the mold clamping apparatus.

Ordinarily, the mold-opening or mold-closing operation for the present cycle is completed without generation of the operation stop command, and hence the program advances to the step S18 of the main routine of FIG. 3. That is, a timer is restarted (the step S18), and a time measurement is initiated, and further a determination is made as to whether or not a time period t has elapsed from the instant at which the mold clamping is completed until the preset cooling time period T (the step S19 is reached). Upon elapse of the cooling time period, the numerical control apparatus 30 supplies the servomotor 20 with a command for causing rotation of the crank plate 8 over the rotation angle $\theta$ in the same rotational direction as that in the step S9, so as to initiate the movement of the movable platen 1 toward the mold-opening or mold-closing direction (the step S20). Then, the subroutine of FIG. 4 is re-entered (the step S21), and the program returns to the step S7 after the completion of the mold-opening or mold-closing operation for the present cycle is ascertained.

As mentioned above, since, after the start of the injection molding cycle at the step S6, the sign of the rotation angle $\theta$ which specifies the rotational direction of the crank plate is inverted upon each cycle where a loop consisting of the steps S7 to S21 is executed, the crank plate 8 is rotated in the forward and reverse directions so that the pin 9 alternately assumes the rotational position $\theta$ of FIG. 1B and the position $-\theta$ of FIG. 1C via the position 0 of FIG. 1A. With this reciprocal rotation, the movable platen 1 is reciprocated between the mold clamping position and the mold-opening end position.

On the other hand, if it is determined at the step S10 that the operation stop command has been delivered, the program advances to the step S12 so as to stop the rotation of the servomotor 20. Next, whether the angular position $\alpha$ at which the servomotor 20 stops is larger or less than the angular position 0 corresponding to the mold clamping position is determined, that is, whether the valve $\alpha$ is positive or negative is determined on the basis of a value of the current position register (the step S13). If the value $\alpha$ is positive, a target rotational angular position $\theta$ upon restart of the operation mentioned later is set to a positive value (the step S14), whereas if the value $\alpha$ is negative, the same target position $\theta$ is set to a negative value (the step S15). As a result, the time period required for restart of the operation is shortened. Next, a determination is made as to whether or not the restart of the injection molding cycle is required on the basis of a selection signal inputted by the operator through the MDI 31 and indicative the necessity of the restart of the cycle (the step S16). If the restart of the operation is selected, the numerical control apparatus 30 supplies the servomotor 20 with a command for causing rotation of the crank plate 8 up to the target angular position $\theta$, so that the crank plate 8 is rotated to the rotational position shown in FIG. 1B or FIG. 1C, to thereby restore the movable platen 1 to its mold-opening end position (the step S17), i.e., to complete the preparation for the start of the injection molding cycle. Thereafter, the program advances to the step S06 for awaiting the supply of the cycle start signal. If it is determined at the step S16 that the restart of the molding cycle is not required, the control program ends, and the operation of the injection molding machine is stopped.

In the foregoing embodiment, the pin 9 is provided on the crank plate 8 at a location closest to the movable platen so that the pin 9 is rotated within the rotation range defined by the movable limits, corresponding to the rotation positions $\theta$ and $-\theta$, and including the rotational position 0. However, a pin may be provided at a location diametrically opposite the location at which the pin 9 is provided, so that this pin is rotated within a rotation range, corresponding to a remaining part other than the above-mentioned rotation range.

We claim:

1. A crank mold clamping apparatus having a mold-opening stroke whose length is variable, comprising:
   a crank disposed for rotation;
   a coupling member coupling said crank and a movable platen;
   means coupled to said crank for driving said crank in a forward and reverse rotational direction;
   means for variably setting the length of the mold-opening stroke; and
   means for controlling said driving means so that said crank is rotated forwardly and reversely within a limited rotational angular region corresponding to the length of the mold-opening stroke.

2. A crank mold clamping apparatus according to claim 1, wherein said driving means comprises a servomotor, said setting means comprises a manual data input device, and said controlling means comprises a numerical control apparatus.

3. A crank mold clamping apparatus according to claim 1, wherein said driving means comprises a servomotor.

4. A crank mold clamping apparatus according to claim 1, wherein said setting means comprises a manual data input device.

5. A crank mold clamping apparatus according to claim 1, wherein said controlling means comprises a numerical control apparatus.

6. A crank mold clamping apparatus according to claim 1, wherein said crank comprises a circular crank plate.

* * * * *

UNITED STATES PATENT AND TRADEMARK OFFICE
CERTIFICATE OF CORRECTION

PATENT NO. : 5,069,613

DATED : December 3, 1991

INVENTOR(S) : YOSHIHARA INABA AND MASAO KAMIGUCHI

It is certified that error appears in the above-identified patent and that said Letters Patent is hereby corrected as shown below:

Title page, [56] References Cited - U.S. PATENT DOCUMENTS - "4,158,539  6/1197  Arends et al. ..... 425/451.4" should be --4,158,539  6/1979  Arends et al. ..... 425/451.4--.

Column 1,   line 12, "length stroke" should be --stroke length--;
            line 36, after "degree" insert --of the--.

Column 2,   line 49, after "bars" insert --3--;
      line 68, "2 the mold 11," should be --2. The mold 11--.

Column 3,   line 40, "$S=2l_1(l_1=l_2)$" should be --$S+2l_1(l_1+l_2)$--;
            line 59, "2" should be --3--;
            line 65, "a" should be --the--, and "the" should be --a--.

UNITED STATES PATENT AND TRADEMARK OFFICE
CERTIFICATE OF CORRECTION

PATENT NO. : 5,069,613
DATED : December 3, 1991
INVENTOR(S) : Yoshihara Inaba and Masao Kamiguchi It is certified that error appears in the above-indentified patent and that said Letters Patent is hereby corrected as shown below:

Column 5, line 35, after "indicative" insert --of--.

Signed and Sealed this

Twenty-fourth Day of August, 1993

Attest:

BRUCE LEHMAN

Attesting Officer    Commissioner of Patents and Trademarks